(12) United States Patent
Wilsher et al.

(10) Patent No.: US 9,781,283 B1
(45) Date of Patent: Oct. 3, 2017

(54) DOCUMENT HANDLER HAVING INTEGRATED PLATEN AND FULLY INTERNAL CVT PATH

(71) Applicant: Xerox Corporation, Norwalk, CT (US)

(72) Inventors: Michael John Wilsher, Letchworth (GB); Michael Peter Golding, Ware (GB); Roy Norman Gladwin, Aylesbury (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/164,331

(22) Filed: May 25, 2016

(51) Int. Cl.
*H04N 1/04* (2006.01)
*H04N 1/00* (2006.01)
*B65H 1/04* (2006.01)

(52) U.S. Cl.
CPC ........... *H04N 1/00628* (2013.01); *B65H 1/04* (2013.01); *H04N 1/00541* (2013.01); *H04N 1/00588* (2013.01); *H04N 1/00615* (2013.01); *B65H 2301/544* (2013.01); *B65H 2402/41* (2013.01); *B65H 2801/39* (2013.01); *H04N 2201/0081* (2013.01)

(58) Field of Classification Search
CPC ....... H04N 2201/0094; H04N 1/00204; H04N 1/193; H04N 1/1938; H04N 1/3263; H04N 1/32678; H04N 2201/0015; H04N 2201/0068; H04N 2201/33378; H04N 1/00233; H04N 1/00413; H04N 1/00416; H04N 1/0044
USPC ............. 358/1.15, 474, 1.13, 482, 483, 497; 399/88, 107, 401; 715/239, 273
See application file for complete search history.

(56) References Cited

U.S. PATENT DOCUMENTS

| | | | | |
|---|---|---|---|---|
| 4,849,790 A | * | 7/1989 | Ito | G03G 15/50 271/288 |
| 5,292,113 A | * | 3/1994 | Morigami | B65H 5/026 271/198 |
| 5,568,281 A | * | 10/1996 | Kochis | H04N 1/00681 358/475 |
| 5,682,227 A | | 10/1997 | Taguchi et al. | |
| 5,884,123 A | | 3/1999 | Stickney et al. | |
| 5,895,928 A | * | 4/1999 | Kerschner | H04N 1/00681 250/559.37 |
| 5,896,206 A | * | 4/1999 | Kellogg | H04N 1/00543 358/494 |
| 5,918,089 A | * | 6/1999 | Malinich | G03G 15/80 361/809 |
| 7,800,788 B2 | | 9/2010 | Yazawa et al. | |

(Continued)

*Primary Examiner* — Negussie Worku
(74) *Attorney, Agent, or Firm* — Gibb & Riley, LLC

(57) ABSTRACT

A detachable document handler (having an outer casing) has a transparent platen as the casing bottom, and a document tray as the casing top. A moveable internal scanner is located within the outer casing, and is positioned to move past the transparent platen within the outer casing. The moveable internal scanner is in a location within the outer casing to optically scan items external to the outer casing through the transparent platen. A sheet feeder system are also within the outer casing. The sheet feeder system (within the outer casing) is positioned adjacent the document tray in a location to feed sheets from the document tray, internally within the outer casing, past the moveable internal scanner, and back to the document tray. A transparent member within the outer casing is located between the sheet feeder system and the moveable internal scanner.

14 Claims, 10 Drawing Sheets

(56) References Cited

U.S. PATENT DOCUMENTS

| | | | |
|---|---|---|---|
| 8,134,757 B2 | 3/2012 | Torimaru et al. | |
| 8,467,107 B2 | 6/2013 | Golding et al. | |
| 8,654,417 B2* | 2/2014 | Okada | H04N 1/00915 |
| | | | 358/474 |
| 8,675,266 B2 | 3/2014 | Watts | |
| 9,288,359 B2 | 3/2016 | Wilsher et al. | |
| 9,444,966 B2* | 9/2016 | Fukawa | H04N 1/125 |
| 2005/0111059 A1 | 5/2005 | de Koning | |
| 2008/0203649 A1 | 8/2008 | Watase et al. | |
| 2009/0174916 A1 | 7/2009 | Ootsuka et al. | |
| 2009/0219580 A1 | 9/2009 | Cornell et al. | |
| 2010/0080631 A1* | 4/2010 | Ogiyama | G03G 15/161 |
| | | | 399/308 |
| 2010/0181715 A1* | 7/2010 | Wilsher | B65H 5/068 |
| | | | 271/3.14 |
| 2010/0238524 A1* | 9/2010 | Yang | G03G 15/605 |
| | | | 358/498 |
| 2011/0235131 A1* | 9/2011 | Hanamoto | H04N 1/00519 |
| | | | 358/474 |
| 2012/0250108 A1* | 10/2012 | Wilsher | H04N 1/00814 |
| | | | 358/475 |
| 2013/0214476 A1 | 8/2013 | Asada et al. | |
| 2015/0036196 A1* | 2/2015 | Miyamoto | H04N 1/00551 |
| | | | 358/498 |
| 2015/0116744 A1* | 4/2015 | Bouche | G06F 3/1211 |
| | | | 358/1.13 |
| 2015/0172501 A1* | 6/2015 | Wilsher | H04N 1/1039 |
| | | | 358/498 |
| 2015/0326744 A1* | 11/2015 | Onuki | H04N 1/00737 |
| | | | 358/1.2 |
| 2016/0044193 A1* | 2/2016 | Wells, II | H04N 1/00543 |
| | | | 358/498 |
| 2016/0330344 A1* | 11/2016 | Wilsher | H04N 1/1065 |

* cited by examiner

DOCUMENT HANDLER HAVING INTEGRATED PLATEN AND FULLY INTERNAL CVT PATH

BACKGROUND

Systems and methods herein generally relate to copying and printing devices, and more particularly to document handler scanning devices used with copiers and printers.

Document handlers are devices that quickly scan sheets for the purpose of making copies or acquiring digital images. Document handlers are often included as part of copiers and printing devices, and contain sheet feeders (also knows as a constant velocity transport (CVT) devices) that transport sheets by an optical scanner that can be positioned within the body of a copier, and below a transparent platen. Such a scanner may include an array of optical sensors (such as charge couple devices (CCDs) or other types of optical elements) that extend across the full width of the platen, and such scanning arrays are therefore often referred to as full with array (FWA) type scanners.

Such FWA devices may move beneath the transparent platen to obtain a digital image of the item placed on top of the platen. In other situations, the FWA can move over to a location where the CVT of the document handler are directing sheets, potentially over a different transparent platen element (which is often referred to as a CVT glass) to allow the FWA within the body of the copier to obtain a scan of such sheets through the CVT glass. Such systems allow users to deposit large stacks of sheets within the document handler; after which the document handler, in coordination with the internal components beneath the transparent platen, provide high speed optical scanning of such sheets.

SUMMARY

Exemplary printing systems herein include a printer and a separate document handler connectable to the printer, or other flat surface. The printer has document handler connection features and the document handler has hinged connectors on the exterior of an outer casing of the document handler. The hinged connectors are sized and shaped to connect to the document handler connection features of the printer.

The document handler is a detachable document handler, and is not necessarily always connected to the printer. The document handler has an outer casing, and has a transparent platen as the casing bottom, and a document tray as the casing top.

A moveable internal scanner is located within the outer casing, and is positioned to move past the transparent platen within the outer casing. The moveable internal scanner is in a location within the outer casing to optically scan items that are external to the outer casing through the transparent platen. More specifically, the transparent platen is adjacent to, and parallel with, the top surface of the printer when the hinged connectors are connected to the printer, and the document handler rests on the top of the printer. Internal scanner guides are also located within the outer casing, and the internal scanner guides move the moveable internal scanner in a direction parallel to the flat surface of the transparent platen.

The sheet feeder system within the outer casing is positioned adjacent the document tray in a location to feed sheets from the document tray, internally within the outer casing, past the moveable internal scanner, and back to the document tray. Thus the sheet feeder system has sheet guides directing the sheets in a loop from the document tray, past the moveable internal scanner, and back to the document tray. This loop is entirely internal within the outer casing.

A transparent member within the outer casing is located between the sheet feeder system and the moveable internal scanner and keeps the sheets being transported by the sheet feeder system from contacting the moveable internal scanner. Additionally, electrical connections on the exterior of the outer casing are shaped to connect to the printer.

Optionally, a fixed internal scanner can also be included within the outer casing, positioned adjacent the sheet feeder system. The moveable internal scanner is positioned on one side of the sheet feeder system and scans one side of the sheets, and the fixed internal scanner is positioned on the other side of the sheet feeder system and scans the other side of the sheets.

The document tray has at least one opening, and the sheet feeder system draws the sheets into internal areas of the outer casing through the opening(s) and transports the sheets from the internal areas of the outer casing through the opening(s) back to the document tray. The outer casing forms a continuous sealed member, interrupted only by the opening(s) in the document tray.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, document handlers with sheet feeders are highly useful in allowing users to scan large numbers of sheets with ease. However, the CVT systems within conventional document handlers are subject to jamming and debris accumulation, and the CVT glass can become easily contaminated and/or damaged. In order to address such issues, the devices herein utilize a CVT scanning system that is completely enclosed in the document handler, and therefore the paper does not exit the document handler to pass by the platen surface.

Thus, the devices herein integrate the scanner into the paper path and use a completely enclosed paper path that dramatically reduces the possibility of paper jams, because the interfaces are completely contained within one module (the document handler itself). The scanning path is fully enclosed within the document handler, reducing external contamination. The CVT glass can be separate, or part of, the image module. An internal door within the document handlers can be opened for cleaning, as required. Also, the CVT area on the platen surface is no longer required, as such in included internally within the document handler.

These devices reduce critical interface between modules, improve the reliability, improve jam performance, reduce external contamination, and provide a flatter platen area (with just a registration edge). Additionally, the platen can be entirely flat, and is therefore not sensitive to being fully closed to perform a scan.

The document handler described below can be easily added to existing printers. Further, self-adhesive registration strips can be added to the top surface of such existing printers, to allow items to be properly located on the top of the printer for scanning. Thus, these structures allow document handlers to be added to standalone printer configurations, to convert such devices to multi-function printers (MFPs) very simply, without any removal of parts, and possibly just the addition of registration strips. Thus, the document handler described herein can be added as a field upgrade to existing printers, for example.

Also, the platen and CVT glass do not need to be the same thickness (it has been found that the CVT glass can be a weak point in some systems). Here, the platen glass does not have to withstand posterior stresses and, the CVT glass is protected because it is fully enclosed within the document handler, so the CVT glass does not have to be as strong, allow a thinner CVT platen glass to be used.

A ramp can be used as part of the internal sheet guide within the document handler, and keeping the ramp internal to the document handler greatly improves the reliability and jam performance of the document handler, reduces external contamination, and allows a flatter platen area.

Figure 1:
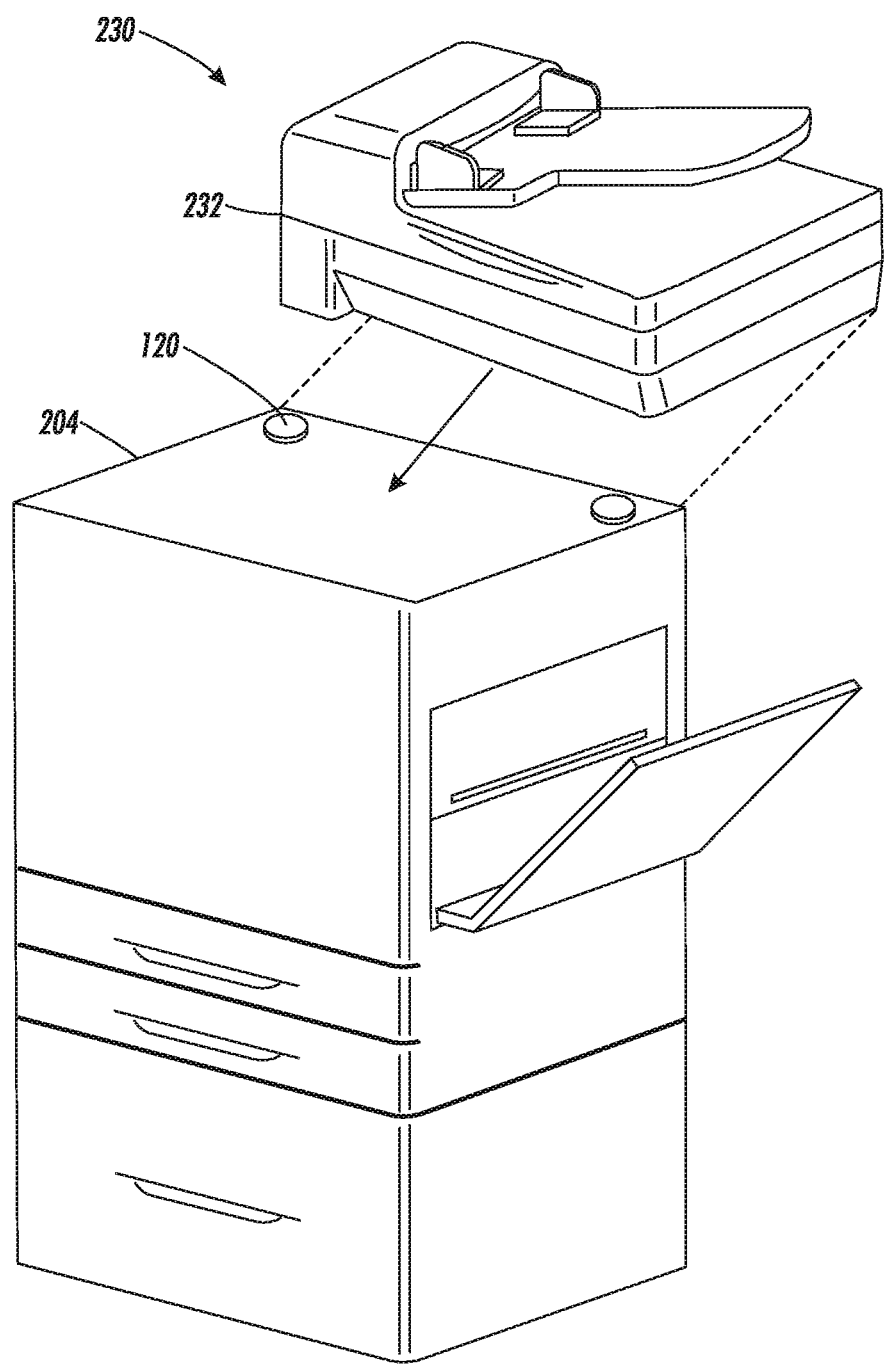
FIG. 1 is a perspective schematic diagram illustrating devices herein.

As shown in FIG. 1, exemplary printing systems herein include a printer 204 and a separate document handler 230 connectable to, and disconnectable from, the printer 204. The document handler 230 has an outer casing 232 (with a relative "top" and "bottom" oriented opposite one another, as shown in the drawings). The printer 204 has document handler connection features 120. The document handler 230 is a detachable document handler 230, and is not necessarily always connected to the printer 204.

Figure 2A:
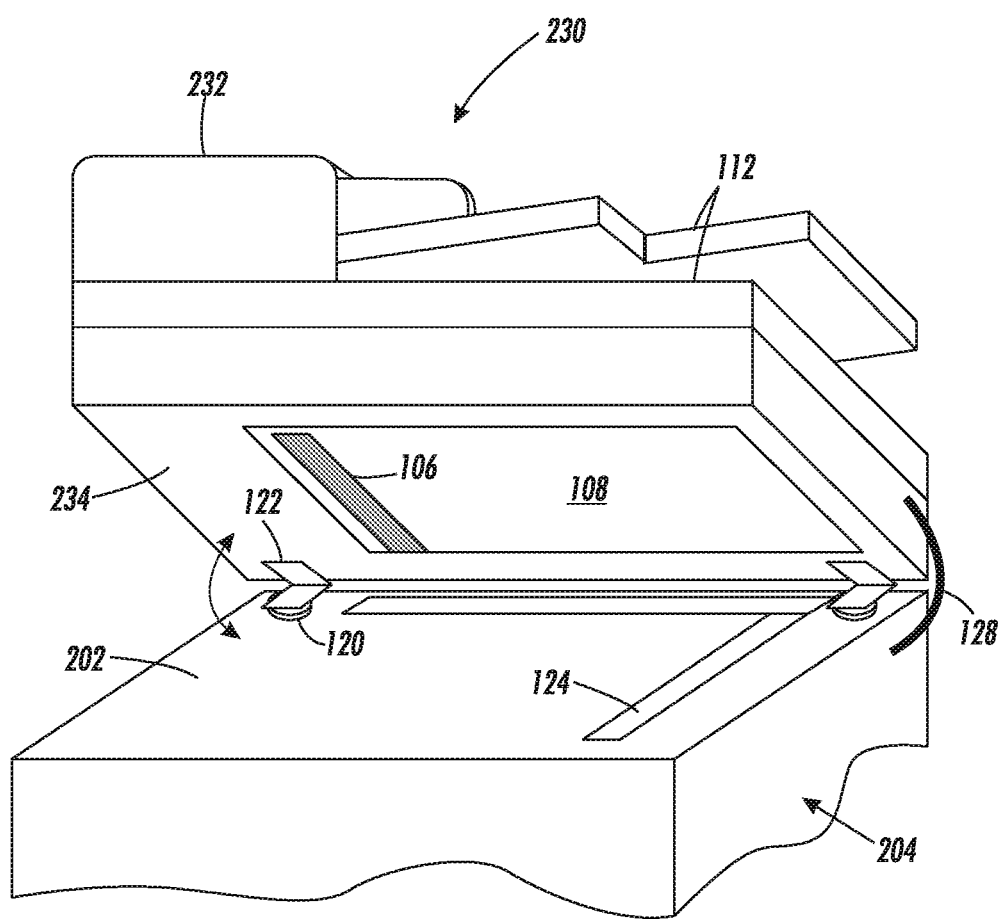
FIGS. 2A-2B are perspective schematic diagrams illustrating a portion of devices shown in FIG. 1.

As shown in FIG. 2A, the document handler 230 has hinged connectors 122 on the exterior of an outer casing 232 of the document handler 230. The hinged connectors 122 are sized and shaped to connect to the document handler connection features 120 of the printer 204. For example, the document handler connection features 120 can be threaded openings, slots, threaded bolts, pins, plates, etc.; and the hinged connectors 122 can be corresponding screw-on connectors, slot connectors, post-connectors, plate-connectors, that can be connected using bolts, wing-nuts, cotter-pins, clips, etc. In other words, the document handler connection features 120 and the hinged connectors 122 are any connector pairs that are sized and shaped to quickly and easily connect and disconnect from one another in a manner that allows of the document handler 230 to be rotated upward (so that the bottom surface 234 of the outer casing 232 is not parallel with the top surface 202 of the printer 204) and closed downward (so that the bottom surface 234 of the outer casing 232 is parallel with the top surface 202 of the printer 204). Additionally, electrical connections 128 on the exterior of the outer casing 232 are shaped and positioned to connect to the printer 204.

As can be seen in FIG. 2A, the bottom surface 234 of the outer casing 232 of the document handler 230 includes a transparent platen 108, and a document tray 112 is included as part of the top of the outer casing 232. A moveable internal scanner 106 is located within the outer casing 232, and can be seen through the transparent platen 108 in FIG. 2A. All scanners herein can be any form of optical scanner, whether currently known or developed in the future, and can include an array of optical detectors, lights, etc.

The moveable internal scanner 106 is positioned to move past the transparent platen 108 within the outer casing 232, so as to scan items that are placed on the top surface 202 of the printer 204. The moveable internal scanner 106 is in a location within the outer casing 232 to optically scan items that are external to the outer casing 232 through the transparent platen 108, such as items that may be placed on the top surface 202 of the printer 204. The image created as a result of the scanning process can then be communicated to the printing components of the printer 204 through the electrical/communication connection 128, to allow a copy of the scanned item to be printed by the printer 204, or to allow the electronic (digital) image of the item to be stored, processes, and/or transmitted to other devices.

Figure 2B:
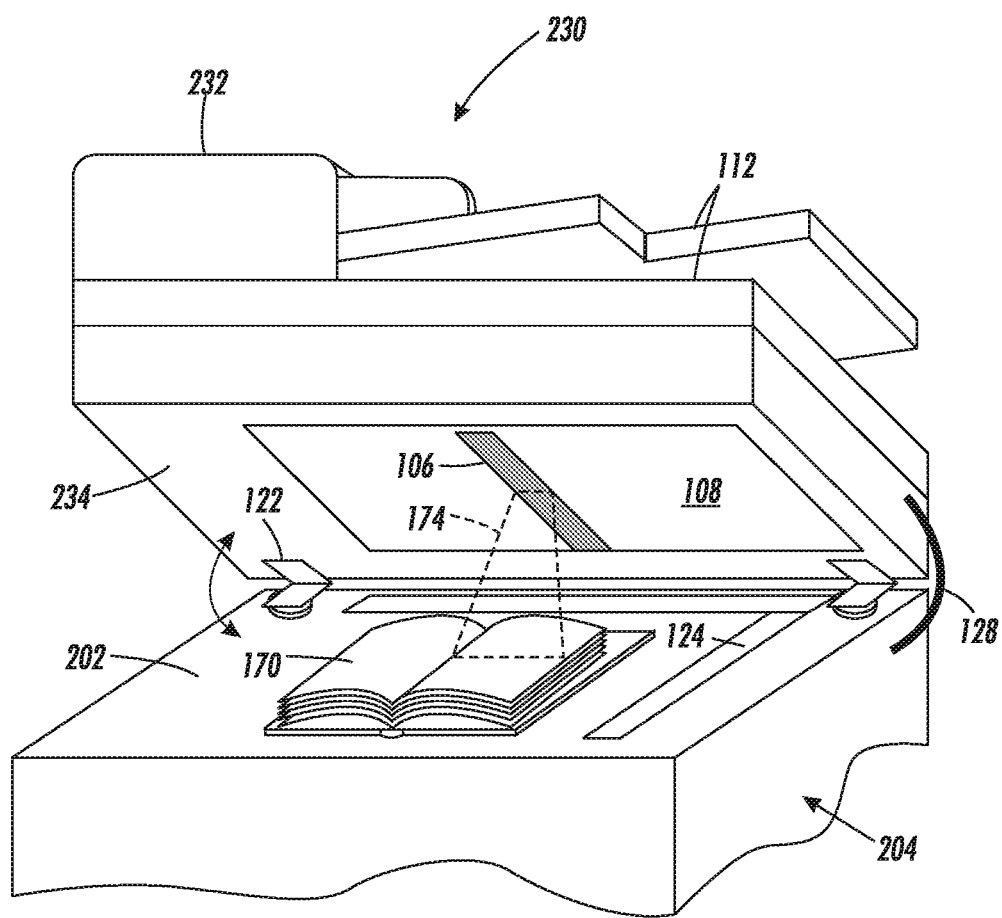

If desired, optional alignment markings 124 (which can be, for example, painted markings, self-adhesive stickers, etc.) can be added to the solid, non-transparent top surface 202 of the printer 204 to help align items (books, papers, etc.) to be scanned by the moveable internal scanner 106 within the document handler 230. Some locations for exemplary alignment markings 124 are shown in FIGS. 2A and 2B, but those ordinarily skilled in the art would understand that other markings and other locations could be utilized. While the document handler is shown in the raised position (rotated up on the hinges 122) in FIG. 2A, when in the closed position (rotated down on the hinges 122) the bottom surface 234 of the outer casing 232 is parallel to the top surface 202 of the printer 204.

For example, FIG. 2B shows a book 170 on the top surface 202 of the printer 204. Note that, instead of being placed face down on a conventional platen, instead the pages of the book 170 being scanned are placed face up, and face the transparent platen 108 of the outer casing 232 to allow the scanner 106 that is within the outer casing 232 to scan the pages of the book 170 (and the dashed lines 174 are used to indicate a scanning process).

Note that the document handler 230 would actually be rotated downward more (so that the bottom surface 234 of the outer casing 232 is more parallel with the top surface 202 of the printer 204) than is shown in FIG. 2B when actually performing scanning; however, for clarity of illustration, the document handler 230 is shown as being more open and then it would actually be. In reality, the transparent platen 108 actually makes contact with, and presses against, the pages of the book 170 when performing such scanning, as shown in FIG. 3A, discussed below.

Figure 3A:
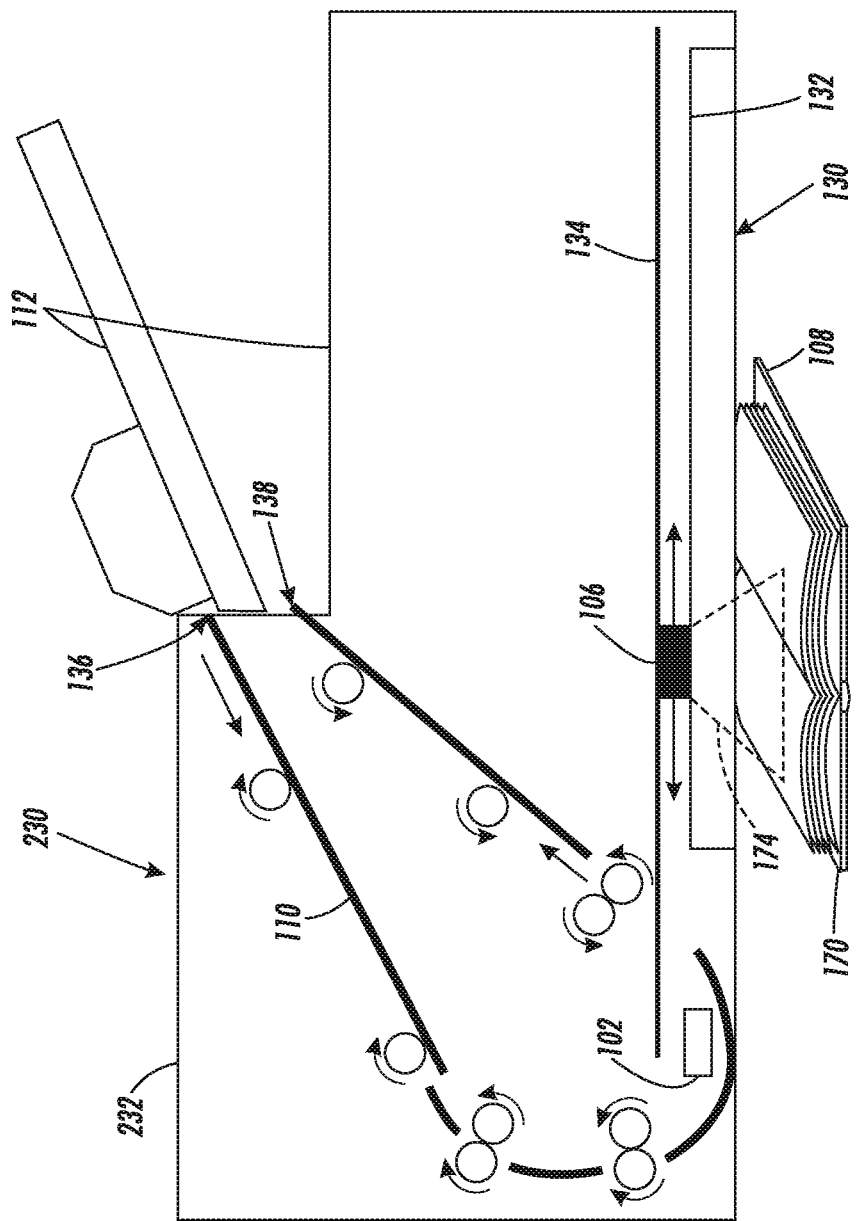
FIGS. 3A-3D are cross-sectional schematic diagrams illustrating a portion of devices shown in FIG. 1.

FIGS. 3A-3D illustrate cross-sectional views of the document handler 230 discussed above. As can be seen in FIG. 3A, the moveable internal scanner 106 is moved by a scanner guide system 134 in a direction parallel to the transparent platen 108 (denoted by the arrows in FIG. 3A). Note that the transparent platen 108 has a bottom or external surface 130, which forms part of the outer casing 232, and has a top or internal surface 132 along which the moveable internal scanner 106 moves. The scanner guide system 134 can be any form of device that moves the moveable internal scanner 106 back-and-forth along and parallel to the internal surface 132 of the transparent platen 108, and can include, for example, wires, drive belts, cabling, rods, etc., driven by motors, magnets, hydraulics, pneumatics, etc.

As also shown in FIGS. 3A-3D, a sheet feeder system 110 has sheet guides, rollers, nips, etc., directing sheets (items 176 in FIG. 3B) in a loop from the document tray 112, past internal components of the document handler 230, and back to the document tray 112. Such a loop is entirely internal within the outer casing 232.

Figure 3B:
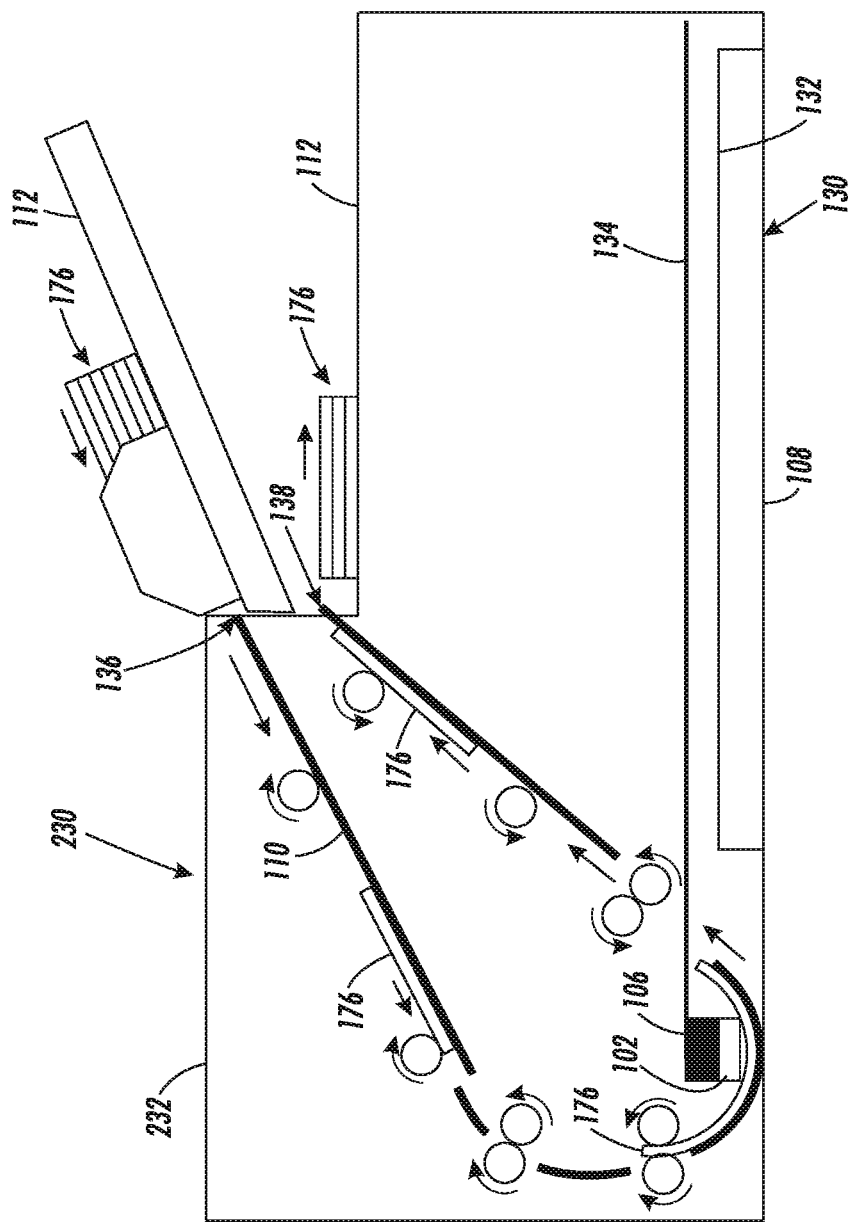

FIG. 3B illustrates the same structure shown in FIG. 3A; however, in FIG. 3B, the scanner guide system 134 moves the moveable internal scanner 106 to be adjacent a transparent member 102 (which is sometimes referred to as a constant velocity transport (CVT) glass). The sheet feeder system 110 within the outer casing 232 is positioned adjacent the document tray 112 in a location to feed sheets from the document tray 112, internally within the outer casing 232, past the transparent member 102 and fixed moveable internal scanner 106, and back to the document tray 112. The document tray 112 can gravity feed sheets to the sheet feeder system 110, or the document tray 112 can include sheet movement devices, such as vacuum belts, rollers, drive nips, etc.

The transparent member 102 within the outer casing 232 is located between the sheet feeder system 110 and the moveable internal scanner 106 and keeps the sheets 176 being transported by the sheet feeder system 110 from contacting the moveable internal scanner 106.

Therefore, the moveable internal scanner 106 can scan items that are external to the document handler 230 (such as book 170, shown in FIG. 3A) by moving past the transparent platen 108. Alternatively, the moveable internal scanner can move to, and remain in, a fixed position adjacent the transparent member 102 (by operation of the scanner guide system 134) and scan sheets 176 that are transported past the transparent member 102 by the sheet feeder system 110, as shown in FIG. 3B.

Figure 3C:
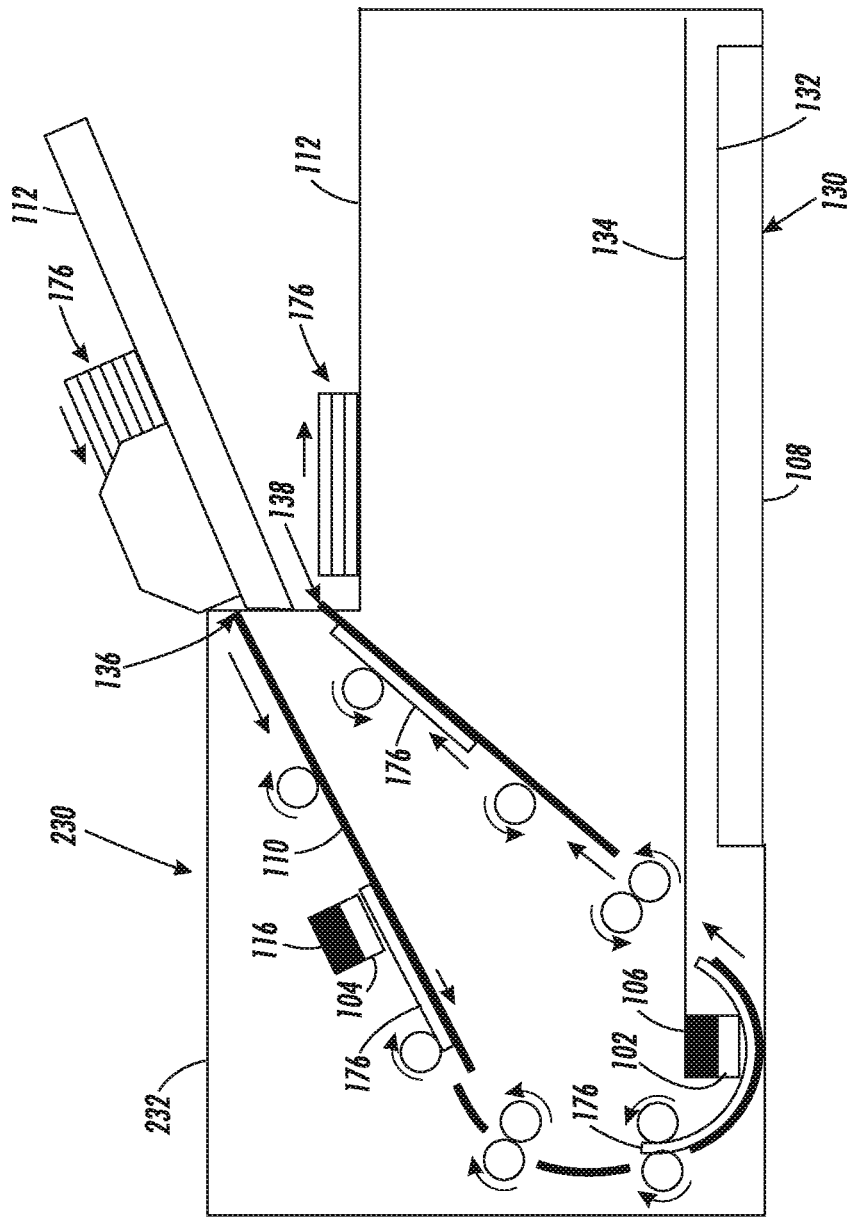

FIG. 3C illustrates the same structure shown in FIG. 3B, except for the inclusion of a second scanner (e.g. fixed scanner) 116 and associated second transparent member 104. The fixed scanner 116 is generally a non-moveable element, and is maintained at the same position relative to the other internal components within the outer casing 232.

As shown in FIG. 3C, the moveable internal scanner 106 is positioned on one side of the sheet feeder system 110 and scans one side of the sheets 176, and the fixed internal scanner 116 is positioned on the other side of the sheet feeder system 110 and scans the other side of the sheets 176. More specifically, as shown in FIG. 3C, the fixed scanner 116 scans one side of the sheets 176 through the second transparent member 104 as the sheets 176 travel along the sheet feeder system 110; and the moveable internal scanner 106 scans the other side of the sheets 176 through the transparent member 102 as the sheets 176 travel along the sheet feeder system 110. In this way, duplex scanning can be performed without requiring sheet inversion, etc.

As would be understood by those ordinarily skilled in the art, the document tray 112 could include any conventional sheet return and sheet inversion mechanism to allow the structure shown in FIG. 3B to also perform duplex scanning; however, with the structure shown in FIG. 3C, the duplex scanning is faster, because the sheets 176 only need to pass through the loop of the sheet feeder system 110 a single time. Also, the structure shown and FIG. 3C eliminates the need for any such additional sheet return and sheet inversion mechanism hardware within the document tray 112, thereby reducing weight, cost, and wear and tear on the sheet feeder system 110; and increasing reliability by decreasing the number of components.

Figure 3D:
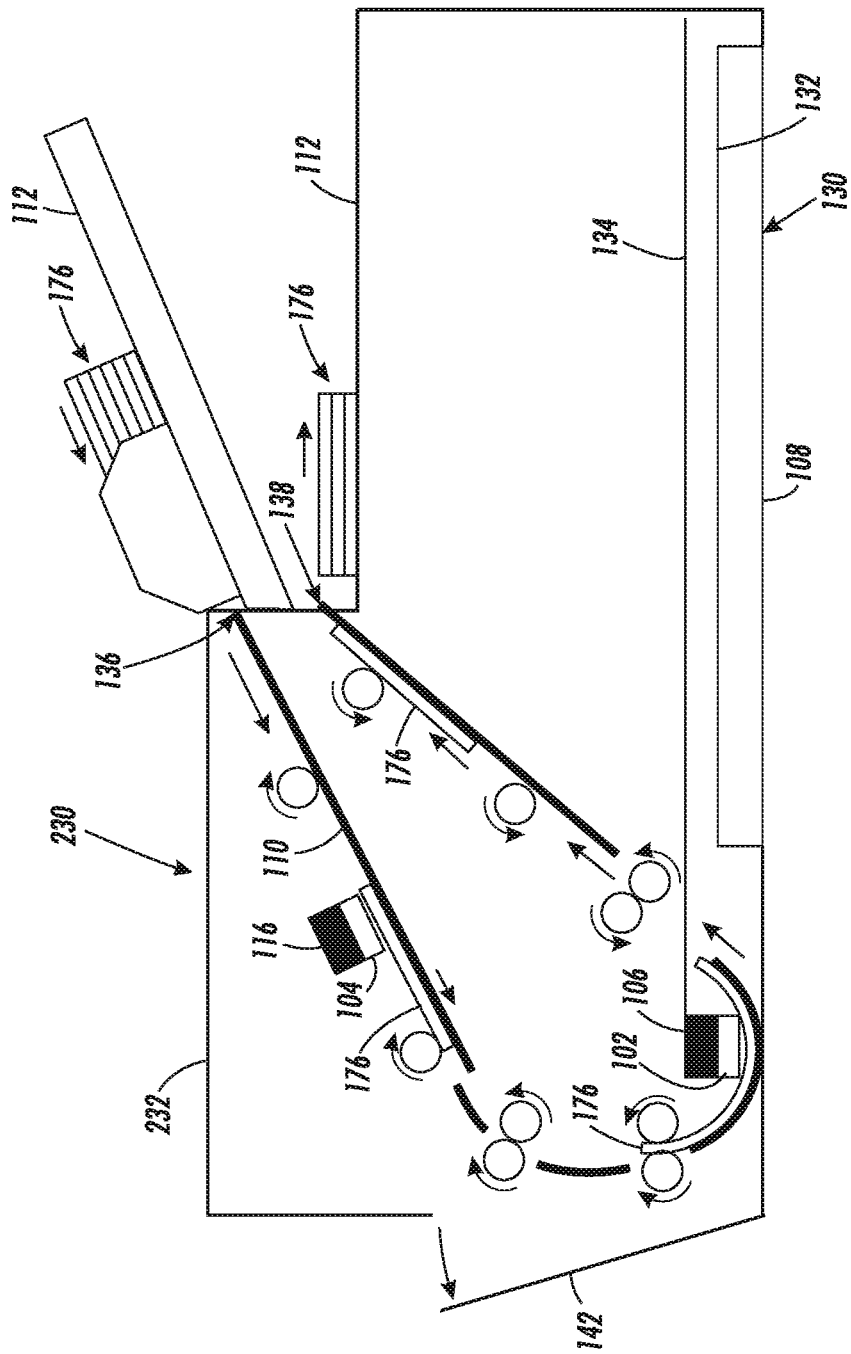

The document tray 112 has at least one opening to allow sheets to pass from the document tray 112 into the outer casing 232, and FIGS. 3A-3D illustrate two such openings 136, 138. Thus, the sheet feeder system 110 draws the sheets into internal areas of the outer casing 232 through one opening 136, and transports the sheets from the internal areas of the outer casing 232 through another opening 138 back to the document tray 112. However, other than such openings 136, 138, the outer casing 232 forms a continuous sealed member, interrupted only by such opening 136, 138, which substantially reduces the amount of foreign matter that is introduced into the outer casing 232. If necessary, as shown in FIG. 3D, one or more doors, drawers, or access panels 142 can be provided to allow the various elements within the other casing 232 to be cleaned of any debris that does accumulate.

Figure 4:
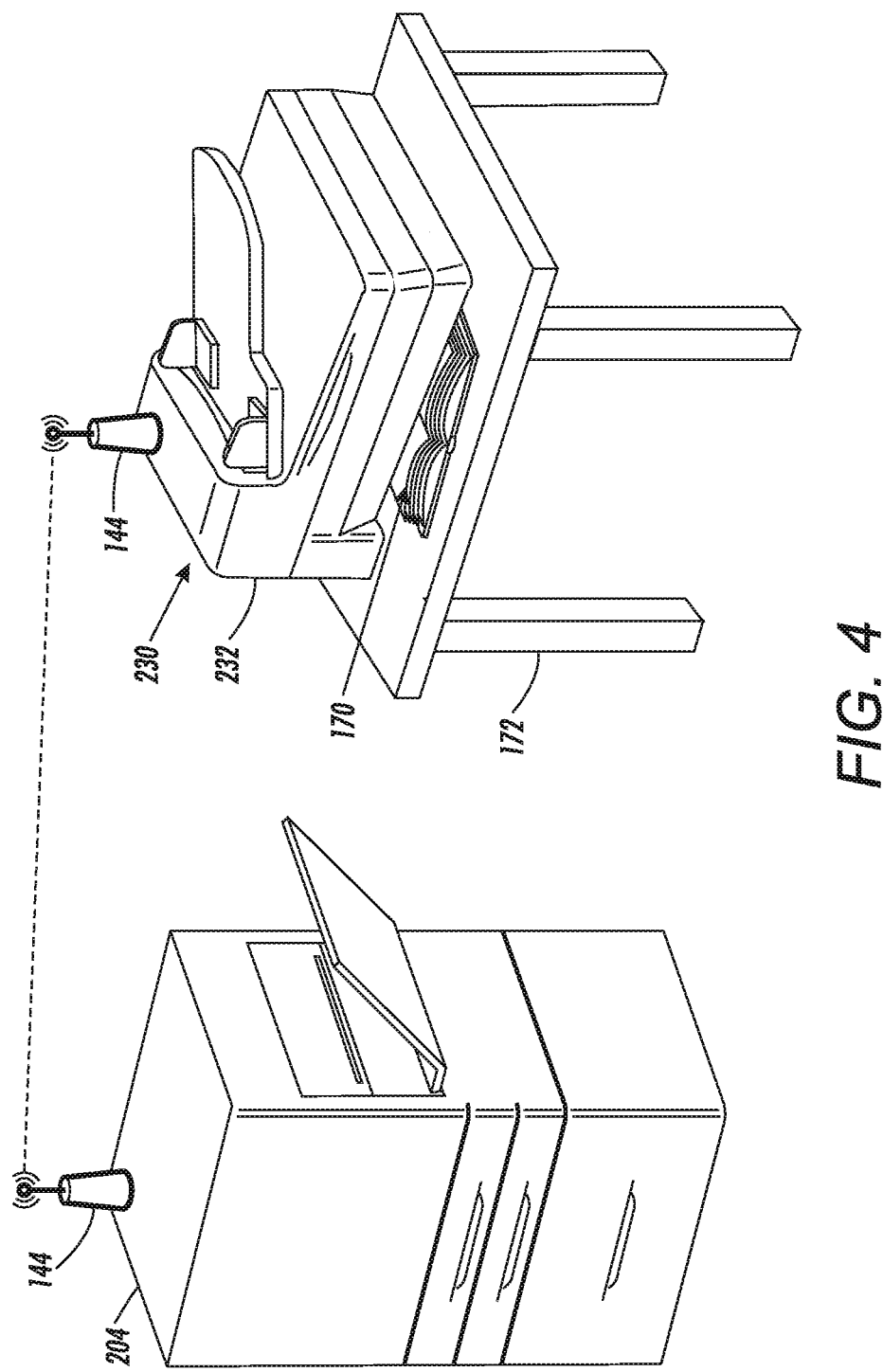
FIG. 4 is a perspective schematic diagram illustrating devices herein.

FIG. 4 illustrates one exemplary use of the devices described herein. While the electrical/communication connection 128 is shown in FIGS. 2A and 2B as being a wired connection, alternatively as shown in FIG. 4, the communication between the document handler 230 and the printer 204 can be wireless communication, using wireless communication devices 144 and the document handler 230 can be independently powered by AC or DC power. Additionally, FIG. 4 illustrates that any surface, such as the flat surface of a table 172, can be used as a scanning surface and the document handler could be attached to this flat surface) Therefore, while the top surface 202 of the printer 204 can be utilized to support the document handler 230, practically any surface capable of physically supporting the document handler can also be utilized for scanning. For example, as shown in FIG. 4, a book 170 can be placed on the table 172 and the document handler 230 can be placed on the book. Here, the moveable internal scanner 106 scans the book 170 through the transparent platen 108, as described above.

Figure 5:
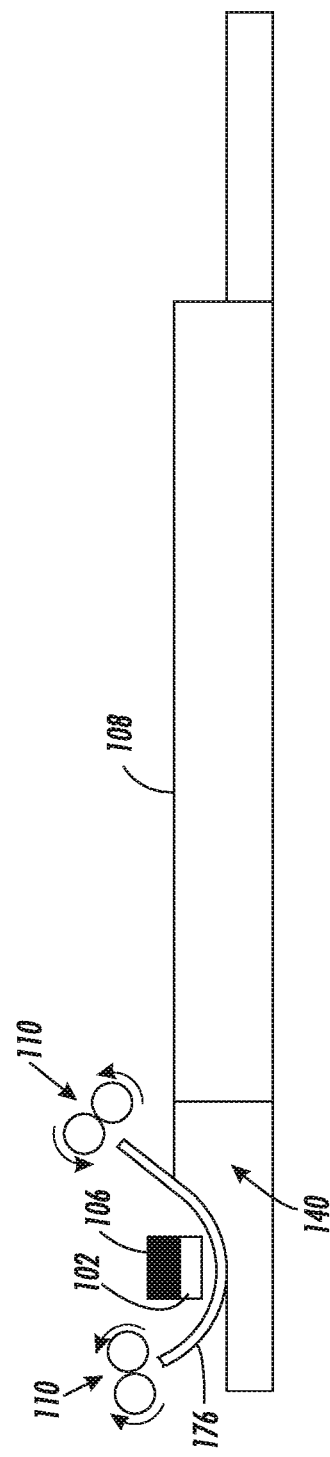
FIG. 5 is a cross-sectional schematic diagram illustrating a portion of devices shown in FIG. 1.

FIG. 5 illustrates one specific example of components that can be included within the sheet feeder system 110. In FIG. 5, nip rollers 110 transport a sheet 176 past the transparent member 102, and a ramp 140 (e.g., CVT ramp) helps direct the sheet 176 into the nip rollers 110. While one example of a ramp is shown in FIG. 5, those ordinarily skilled than the art would understand that many variations of such a structure could be utilized with devices herein.

Figure 6:
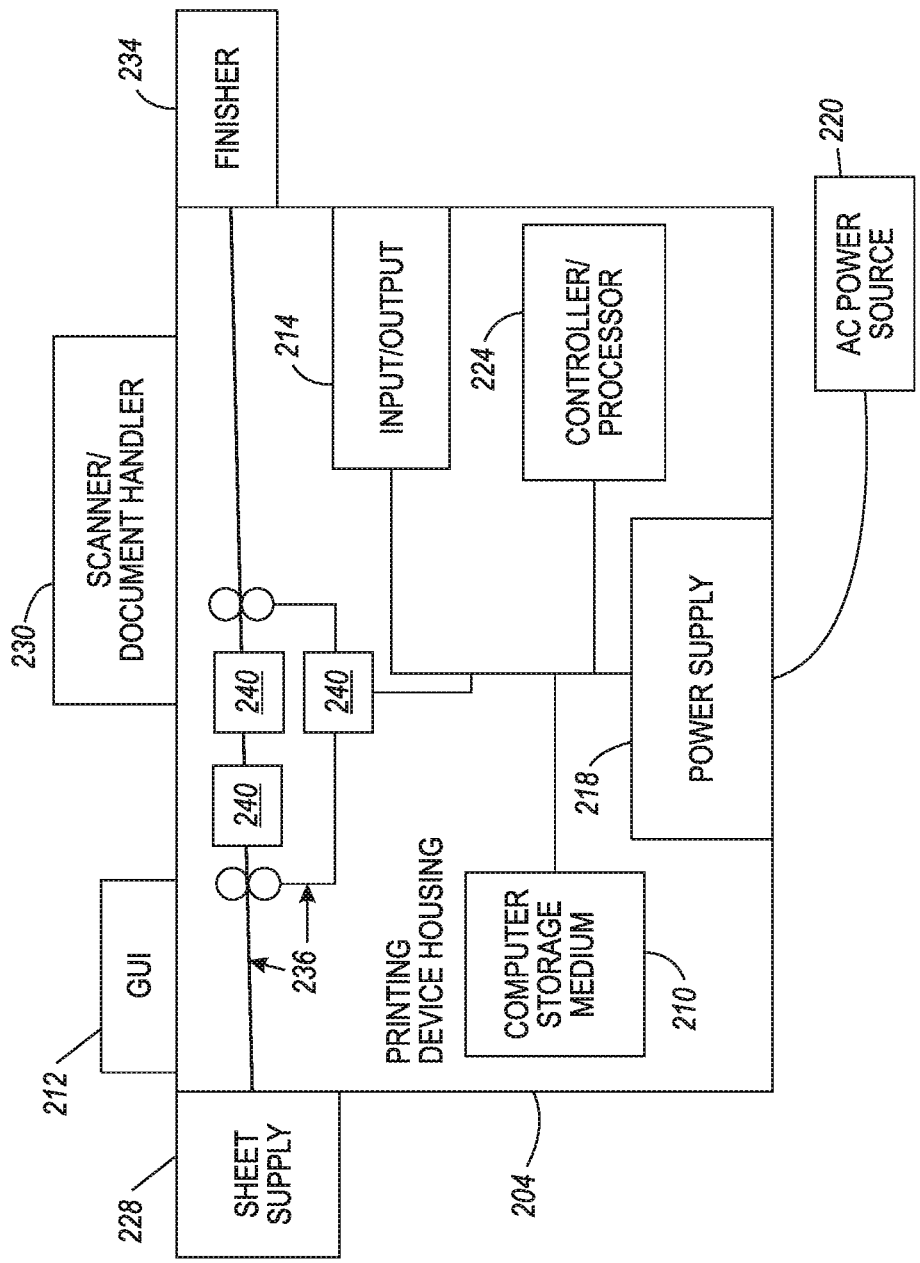
FIG. 6 is a schematic diagram illustrating printing devices herein.

FIG. 6 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 6, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 228 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 230 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   an outer casing having a casing top and a casing bottom on opposite sides of said outer casing, said casing bottom comprises a transparent platen, and said casing top comprises a document tray;
   a moveable internal scanner within said outer casing positioned to move past said transparent platen within said outer casing; and
   a sheet feeder system within said outer casing positioned adjacent said document tray in a location to feed sheets from said document tray, internally within said outer casing, past said moveable internal scanner, and back to said document tray,
   said document tray comprises at least one opening for transporting sheets,
   said sheet feeder system draws said sheets into internal areas of said outer casing through said at least one opening and transports said sheets from said internal areas of said outer casing through said at least one opening back to said document tray, and
   said outer casing forms a continuous sealed member, interrupted by said at least one opening for transporting sheets to and from said document tray.

2. The apparatus according to claim 1, said sheet feeder system comprises sheet guides directing said sheets in a loop from said document tray, past said movable internal scanner, and back to said document tray, and said loop is entirely internal within said outer casing.

3. The apparatus according to claim 1, further comprising a fixed internal scanner within said outer casing positioned adjacent said sheet feeder system, said moveable internal scanner is positioned on one side of said sheet feeder system and scans one side of said sheets, and said fixed internal scanner is positioned on the other side of said sheet feeder system and scans the other side of said sheets.

4. The apparatus according to claim 1, further comprising internal scanner guides within said outer casing, said transparent platen comprises a flat surface, and said internal scanner guides move said moveable internal scanner in a direction parallel to said flat surface of said transparent platen.

5. The apparatus according to claim 1, further comprising connectors on said outer casing, said connectors connect to a printer, said printer has a top surface, and said transparent platen is adjacent to, and parallel with, said top surface of said printer when said connectors are connected to said printer.

6. An apparatus comprising:
   an outer casing having a casing top and a casing bottom on opposite sides of said outer casing, said casing bottom comprises a transparent platen, and said casing top comprises a document tray;
   a moveable internal scanner within said outer casing positioned to move past said transparent platen within said outer casing, said moveable internal scanner is in a location within said outer casing to optically scan items external to said outer casing through said transparent platen;
   a sheet feeder system within said outer casing positioned adjacent said document tray in a location to feed sheets from said document tray, internally within said outer casing past said moveable internal scanner, and back to said document tray;
   a transparent member within said outer casing located between said sheet feeder system and said moveable internal scanner;
   hinged connectors on the exterior of said outer casing, said hinged connectors are sized and shaped to connect to a printer; and
   electrical connections on said exterior of said outer casing, said electrical connections are shaped to connect to said printer,
   said document tray comprises at least one opening for transporting sheets,
   said sheet feeder system draws said sheets into internal areas of said outer casing through said at least one opening and transports said sheets from said internal areas of said outer casing through said at least one opening back to said document tray, and
   said outer casing forms a continuous sealed member, interrupted by said at least one opening for transporting sheets to and from said document tray.

7. The apparatus according to claim 6, said sheet feeder system comprises sheet guides directing said sheets in a loop from said document tray, past said movable internal scanner, and back to said document tray, and said loop is entirely internal within said outer casing.

8. The apparatus according to claim 6, further comprising a fixed internal scanner within said outer casing positioned adjacent said sheet feeder system, said moveable internal scanner is positioned on one side of said sheet feeder system and scans one side of said sheets, and said fixed internal scanner is positioned on the other side of said sheet feeder system and scans the other side of said sheets.

9. The apparatus according to claim 6, further comprising internal scanner guides within said outer casing, said transparent platen comprises a flat surface, and said internal scanner guides move said moveable internal scanner in a direction parallel to said flat surface of said transparent platen.

10. The apparatus according to claim 6, said printer has a top surface, and said transparent platen is adjacent to, and parallel with, said top surface of said printer when said hinged connectors are connected to said printer.

11. A printing system comprising:
    a printer having document handler connection features; and
    a document handler connectable to said printer, said document handler comprising:
        an outer casing having a casing top and a casing bottom on opposite sides of said outer casing, said casing bottom comprises a transparent platen, and said casing top comprises a document tray;
        a moveable internal scanner within said outer casing positioned to move past said transparent platen within said outer casing, said moveable internal scanner is in a location within said outer casing to optically scan items external to said outer casing through said transparent platen;
        a fixed internal scanner within said outer casing;
        a sheet feeder system within said outer casing positioned adjacent said document tray in a location to feed sheets from said document tray, internally within said outer casing past said fixed internal scanner, and back to said document tray;
        a transparent member within said outer casing located between said sheet feeder system and said fixed internal scanner;
        hinged connectors on the exterior of said outer casing, said hinged connectors are sized and shaped to connect to said document handler connection features of said printer; and
        electrical connections on said exterior of said outer casing, said electrical connections are shaped to connect to said printer,
    said document tray comprises at least one opening for transporting sheets,
    said sheet feeder system draws said sheets into internal areas of said outer casing through said at least one opening and transports said sheets from said internal areas of said outer casing through said at least one opening back to said document tray, and
    said outer casing forms a continuous sealed member, interrupted by said at least one opening for transporting sheets to and from said document tray.

12. The apparatus according to claim 11, said sheet feeder system comprises sheet guides directing said sheets in a loop from said document tray, past said movable internal scanner, and back to said document tray, and said loop is entirely internal within said outer casing.

13. The apparatus according to claim 11, further comprising a fixed internal scanner within said outer casing positioned adjacent said sheet feeder system, said moveable internal scanner is positioned on one side of said sheet feeder system and scans one side of said sheets, and said fixed internal scanner is positioned on the other side of said sheet feeder system and scans the other side of said sheets.

14. The apparatus according to claim 11, further comprising internal scanner guides within said outer casing, said transparent platen comprises a flat surface, and said internal scanner guides move said moveable internal scanner in a direction parallel to said flat surface of said transparent platen.

* * * * *